United States Patent
Yuang et al.

(10) Patent No.: US 7,164,686 B2
(45) Date of Patent: Jan. 16, 2007

(54) STEPWISE QUALITY-OF-SERVICE SCHEDULING METHOD IN OUTPUT-BUFFERED SWITCHES FOR BROADBAND NETWORKS

(75) Inventors: Maria Yuang, Taipei (TW); Julin Shih, Taipei (TW); Po-lung Tien, Taipei (TW); Yu Guo Chen, Taipei (TW)

(73) Assignee: Institute for Information Industry, Taipei (TW)

( * ) Notice: Subject to any disclaimer, the term of this patent is extended or adjusted under 35 U.S.C. 154(b) by 1029 days.

(21) Appl. No.: 09/978,368

(22) Filed: Oct. 16, 2001

(65) Prior Publication Data

US 2003/0072317 A1    Apr. 17, 2003

(51) Int. Cl.
*H04L 12/56* (2006.01)
(52) U.S. Cl. .................. 370/412; 370/429; 370/468
(58) Field of Classification Search ........... 370/412, 370/417, 418, 429
See application file for complete search history.

(56) References Cited

U.S. PATENT DOCUMENTS

| | | | |
|---|---|---|---|
| 6,188,698 B1* | 2/2001 | Galand et al. | 370/412 |
| 6,480,911 B1* | 11/2002 | Lu | 710/54 |
| 6,810,426 B1* | 10/2004 | Mysore et al. | 709/234 |
| 6,891,834 B1* | 5/2005 | Dally et al. | 370/395.4 |
| 6,904,056 B1* | 6/2005 | Merani et al. | 370/468 |

\* cited by examiner

*Primary Examiner*—Chau Nguyen
*Assistant Examiner*—Rhonda Murphy
(74) *Attorney, Agent, or Firm*—Fish & Richardson P.C.

(57) ABSTRACT

In a stepwise QoS scheduling method in output-buffered switches for broadband networks, packets are sequentially inserted in a sequence of windows on weight basis. The window size together with the weight of a flow determines the credits in a window for the flow. With sufficient credits, new packets are placed in the current window on a FIFO basis. Otherwise, packets are placed in an upward window being associated with sufficient accumulated credits.

4 Claims, 3 Drawing Sheets

Variable
- $w_i$ = normalized weight of flow $i$;
- $cw$ = index of the current window being served;
- $fw_i$ = index of the window containing flow $i$'s last packet;
- $c_i$ = net credit for flow $i$;
- $pw[k]$ = pointer to Window $k$;
- $pw[k].nw$ = index of the next window from Window $k$;;
- $P_i$ = newly arriving packet for flow $i$;
- $|P_i|$ = size of packet $P_i$;

Initialization() /* idle to busy */
1. $cw \leftarrow 1$;
2. for (each flow $i$) do $fw_i \leftarrow 1; c_i \leftarrow w_i;$ endfor

Arrival($P_i$)
    Compute the index of the window where $P_i$ can be placed;
1. $m \leftarrow 0$;
2. while ($c_i < |P_i|$) do $c_i \leftarrow w_i + c_i; m \leftarrow m + 1;$ endwhile
3. if (there is no flow-$i$ packet in the queue) $m =$ uniform $(0, m);$ endif
4. $fw_i \leftarrow fw_i + m$;
    Place the packet in the window;
5. if ($pw[fw_i]$ does not exist) Create_Window($pw[fw_i]$); endif
6. Enqueue($pw[fw_i], P_i$);
    Update the credit;
7. $c_i \leftarrow c_i - |P_i|$;

Departure()
    Remove the packet from the head of the first window;
1. Dequeue();
    Update variables and pointers if the window becomes empty;
2. if (the window is empty)
3. for (each flow $i$ such that $fw_i = cw$)
4.     $fw_i \leftarrow pw[cw].nw; c_i \leftarrow w_i;$ endfor
5. $cw \leftarrow pw[cw].nw;$ endif

FIG. 2

STEPWISE QUALITY-OF-SERVICE SCHEDULING METHOD IN OUTPUT-BUFFERED SWITCHES FOR BROADBAND NETWORKS

BACKGROUND OF THE INVENTION

1. Field of the Invention

The present invention relates to a scheduling method of a switch and, more particularly, to a stepwise QoS scheduling method in output-buffered switches for broadband networks.

2. Description of Related Art

Broadband networking technology enables the development and deployment of distributed multicast and multimedia applications combining various types of media data, such as text, video, and voice. These broadband applications often require different grades of Quality-of-Service (QoS) requirements, such as delay, jitter, and throughput. To meet these requirements, particularly for output-buffered switches, research emphasis has been placed on the design of scalable schedulers that assure fairness and QoS performance despite ever-increasing magnitude of supported flows.

Recently proposed QoS scheduling algorithms for output-buffered switches advocate the computation and maintenance of a priority queue, according to deadlines, virtual finishing times, or other time stamps that are associated with packets. For example, the packet-by-packet generalized processor sharing (PGPS) algorithm has been proposed as a packet emulation of the ideal bit-by-bit round-robin discipline. At each packet arrival, PGPS computes a timestamp that corresponds to the packet departing time, according to the number of backlogged flows in the system at that instant. Packets are then transmitted in increasing order of their timestamps. A major limitation of PGPS is significant computational complexity $O(N)$, increasing linearly with the number of concurrent flows N.

To reduce computational overhead, much effort has been made on the simplification of the task of priority-queue maintenance. Promising algorithms include Worst-case Fair Weighted Fair Queueing ($WF^2Q$), Self-Clocked Fair Queueing (SCFQ), and Frame-based Fair Queueing (FFQ). In $WF^2Q$, the next packet to serve is selected from a smaller set of packets having already started receiving service in the corresponding GPS system. It offers improved worst-case fairness, but still incurs high computational overhead. SCFQ proposed a simpler approximate computation of timestamps, however resulting in an increase in delay bound and poorer worst-case fairness. Based on a general framework of rate-proportional servers, FFQ adopted a framing mechanism to keep track the amount of normalized service actually received and missed only periodically for simpler timestamp computation. It was shown that the discipline exhibits constant asymptotic computational complexity but undergoes lower grade of worst-case fairness. Another significant limitation is the imposed constraint that the frame size has to exceed the sum of the maximum packet sizes of all flows. As a whole, all above algorithms advocate either static or coarse-grained simplification of timestamp computation, resulting in unnecessary performance downgrade under normal flow intensity. Therefore, it is desirable to provide an improved scheduling method to mitigate and/or obviate the aforementioned problems.

SUMMARY OF THE INVENTION

The object of the present invention is to provide a stepwise QoS scheduling method in output-buffered switches for broadband networks, so as to enable fine-grained, dynamic trade-off balance between performance and complexity.

To achieve the object, the present stepwise scheduling method is used in an output-buffered switch system for broadband networks to guarantee quality of service. The switch system has a plurality of flows i ($i=1\sim N$), each flow i having an output queue. The output queue has a plurality of windows. Each flow i has a corresponding normalized weight $w_i$ and a credit $c_i$, and uses a window index $d_i$ to point to a window. The method comprises the steps of: (A) when packet $P_i$ of flow i arrives, determining whether the credit $c_i$ of flow i is larger than the size of packet $P_i$; (B) if the credit $c_i$ of flow i is smaller than the size of packet $P_i$, adding the normalized weight $w_i$ of flow i to the credit $c_i$, incrementing the window index $d_i$, and executing step (A) again; (C) if the credit $c_i$ of flow i is larger than the size of packet $P_i$, the packet $P_i$ is placed into the window pointed by the window index $d_i$; and (D) subtracting the size of the packet $P_i$ from the credit $c_i$.

Other objects, advantages, and novel features of the invention will become more apparent from the following detailed description when taken in conjunction with the accompanying drawings.

BRIEF DESCRIPTION OF THE DRAWINGS

FIG. 2 shows an algorithm for implementing the present scheduling method; and

DETAILED DESCRIPTION OF THE PREFERRED EMBODIMENT

The stepwise QoS scheduling method in output-buffered switches for broadband networks in accordance with the present invention is assumed non-cut-through and non-preemptive. In other words, a packet is not served until its last bit has arrived, and once a packet is being served, no interruption is permitted until the whole packet is completely served.

Figure 1:
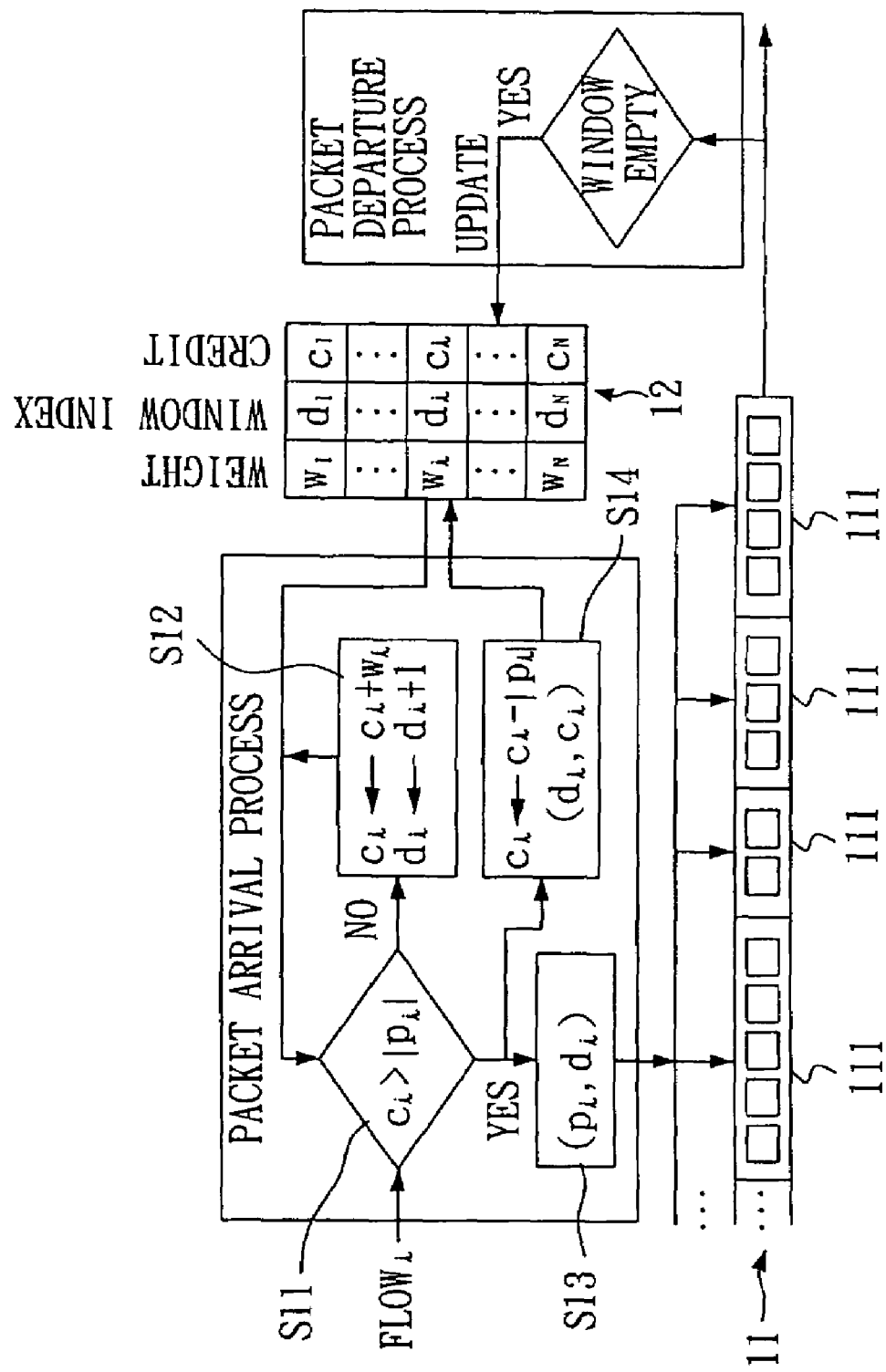
FIG. 1 shows the system architecture for performing the scheduling method of the present invention.

FIG. 1 shows the system architecture for performing the scheduling method of the present invention, wherein the number of flows in the system is assumed to be N. The packet from flow i is processed by the present scheduling method and output through the output queue 11. The output queue 11 has a plurality of windows 111, each window 111 having a size of W. The flows 1, 2, ... N have weights of $w_1^*, w_2^*, \ldots w_N^*$, respectively. Based on the size W of each window 111, the weight $w_i^*$ of each flow i can be normalized to be $w_i = W \times w_i^* / (w_1^* + w_2^* \ldots w_N^*)$.

The scheduling method of the present invention maintains a key variable, called the credit, denoted as $c_i$ for flow i, to keep track of the number of remaining packets which can be inserted in the window containing the last packet from flow i. Therefore, as being illustrated by the packet arrival process in FIG. 1, when packet $P_i$ of flow i arrives, it is determined whether the credit $c_i$ of flow i is larger than the size of packet $P_i$ based on the weight $w_i$, window index $d_i$ and credit $c_i$ corresponding to the flow i stored in a table 12 (step S11).

If not, the normalized weight $w_i$ of flow i is added to the credit $c_i$, and the window index $d_i$ is incremented (step S12). Then, step S11 is executed again.

If step S11 determines that the credit $c_i$ of flow i is larger than the size of packet $P_i$, the packet $P_i$ is placed into one of the windows 111, for example the kth window (window k of FIG. 3), pointed by the window index $d_i$ for being output through the output queue 11 (step S13). In step S14, the size of the packet $P_i$ is subtracted from the credit $c_i$, and the window index $w_i$ and the credit $c_i$ are updated; i.e., the updated window index $w_i$ and the credit $c_i$ are written into the table 12 (step S14).

The packets placed in the windows 111 of the output queue 11 are sequentially output. As shown by the packet departure process in FIG. 1, when all packets have been pushed out and the window 111 is empty, the table 12 is updated to have its initial values.

Figure 3:
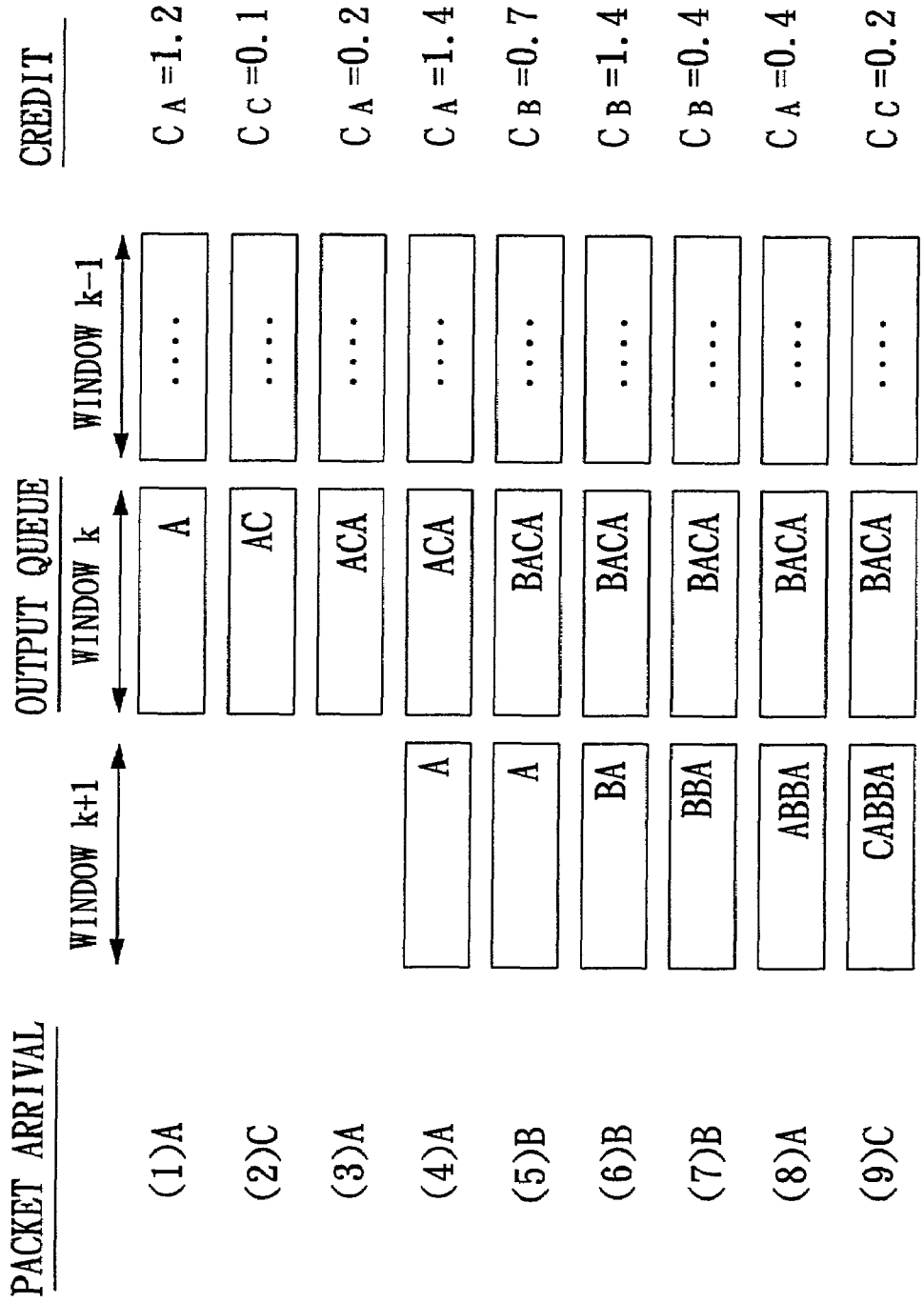
FIG. 3 shows the operation of an example of the present scheduling method.

The scheduling method described above can be implemented as an algorithm shown in FIG. 2. FIG. 3 further shows an example of the present scheduling method. In the example, based on a given window size, W=5, the scheduling method supports three flows, denoted by A, B, and C, with weights $w_A^*$, $w_B^*$, $w_C^*$ given as 4, 3, and 2, respectively. The normalized weights of flows A, B and C with respect to W become: $w_A=5\times4/9=2.2$, $w_B=5\times3/9=1.7$, and $w_C=5\times2/9=1.1$. The credits $c_A$, $c_B$ and $c_C$ of flows A, B and C are initialized to zeros. It is assumed that window k−1 is the last window in the queue and is full in the initial state, and the packet size is one. The packets arrive in a sequence of 'ACAABBBAC'.

As shown in FIG. 2, when the above packets arrives, the present scheduling method operates as follows:

(1) Upon the arrival of packet A, $c_A$ is set to 2.2 and $d_A$ points to window k. Because $c_A$ is larger than the size of packet, packet A is placed in window k, and $c_A$ is decremented by 1 and becomes 1.2.

(2) Upon the arrival of packet C, $c_C$ is 1.1 and $d_C$ points to window k. Because $c_C$ is larger than the size of packet, packet C is placed in window k, and $c_C$ is decremented by 1 and becomes 0.1.

(3) Upon the arrival of packet A, because $C_A$=1.2 is larger than the size of packet, packet A is placed in window k, and $c_A$ is decremented by 1 and becomes 0.2.

(4) Upon the arrival of packet A, because $c_A$=0.2 is smaller than the size of packet, $c_A$ is incremented by 2.2 and becomes 2.4, and $d_A$ is incremented to point to window k+1. At this moment, because $c_A$ is larger than the size of packet, packet A is placed in window k+1, and $c_A$ is decremented by 1 and becomes 1.4.

(5) Upon the arrival of packet B, $c_B$ is 1.7 and $d_B$ points to window k. Because $c_B$ is larger than the size of packet, packet B is placed in window k, and $c_B$ is decremented by 1 and becomes 0.7.

(6) Upon the arrival of packet B, because $c_B$=0.7 is smaller than the size of packet, $c_B$ is incremented by 1.7 and becomes 2.4, and $d_B$ is incremented to point to window k+1. At this moment, because $c_B$ is larger than the size of packet, packet B is placed in window k+1, and $c_B$ is decremented by 1 and becomes 1.4.

(7) Upon the arrival of packet B, because $c_B$=1.4 is larger than the size of packet, packet B is placed in window k+1, and $c_B$ is decremented by 1 and becomes 0.4.

(8) Upon the arrival of packet A, because $c_A$=1.4 is larger than the size of packet, packet A is placed in window k+1, and $c_A$ is decremented by 1 and becomes 0.4.

(9) Upon the arrival of packet C, because $c_C$=0.1 is smaller than the size of packet, $c_C$ is incremented by 1.1 and becomes 1.2, and $d_C$ is incremented to point to window k+1. At this moment, because $c_C$ is larger than the size of packet, packet C is placed in window k+1, and $c_C$ is decremented by 1 and becomes 1.2.

In view of the foregoing, it is known that, in the present scheduling method, packets are sequentially inserted in a sequence of windows on weight basis. The window size together with the weight of a flow determines the maximum number of packets (i.e., the credits) in a window for the flow. With sufficient credits, new packets are placed in the current window on a FIFO basis. Otherwise, packets are placed in an upward window being associated with sufficient accumulated credits. Therefore, the present scheduling method allows FIFO transmissions within the window, and guarantees stepwise weight-proportional service at the window boundary, thereby enabling fine-grained, dynamic trade-off balance between performance and complexity.

Although the present invention has been explained in relation to its preferred embodiment, it is to be understood that many other possible modifications and variations can be made without departing from the spirit and scope of the invention as hereinafter claimed.

What is claimed is:

1. In an output-buffered switch system for broadband networks, the switch system having a plurality of flows i (i=1~N) and an output queue, the output queue having a plurality of windows, each flow i having a corresponding normalized weight $w_i$ and a credit $c_i$, and using a window index $d_i$ to point to a window, wherein the normalized weight of the flow i is $w_i=W\times w_i^*/(w_1^*+w_2^*+\ldots w_N^*)$, $w_i^*$ being the weight of flow i and W being the size of a window, a method comprising the steps of:

(A) when packet $P_i$ of flow i arrives, determining whether the credit $c_i$ of flow i is larger than the size of packet $P_i$ based on the normalized weight $w_i$, window index $d_i$ and credit $c_i$ corresponding to the flow i, wherein the normalized weight $w_i$, window index $d_i$ and credit $c_i$ are stored in a table;

(B) if the credit $c_i$ of flow i is smaller than the size of packet $P_i$, adding the normalized weight $w_i$ of the flow i to the credit $c_i$, incrementing the window index $d_i$, and executing step (A) again;

(C) if the credit $c_i$ of flow i is larger than the size of packet $P_i$, the packet $P_i$ is placed into the window pointed by the window index $d_i$;

(D) subtracting the size of the packet $P_i$ from the credit $c_i$, and (E) scheduling the packets for delivery in a stepwise manner in order to guarantee a quality of service.

2. The stepwise scheduling method as claimed in claim 1, further comprising a step (E) for writing the updated window index $d_i$ and credit $c_i$ into the table.

3. The stepwise scheduling method as claimed in claim 2, wherein the packets placed in the windows of the output queue are output sequentially.

4. The stepwise scheduling method as claimed in claim 3, wherein, when all packets are pushed out and the window is empty, the table is updated to have initial values.

* * * * *